US005700316A

United States Patent [19]

Pontes et al.

[11] Patent Number: 5,700,316
[45] Date of Patent: Dec. 23, 1997

[54] ACOUSTIC INK COMPOSITIONS

[75] Inventors: Fatima M. Pontes, Mississauga; Guerino G. Sacripante, Oakville; Stephan V. Drappel, Toronto; Anthony J. Paine; Gregory J. Kovacs, both of Mississauga, all of Canada

[73] Assignee: Xerox Corporation, Stamford, Conn.

[21] Appl. No.: 624,156

[22] Filed: Mar. 29, 1996

[51] Int. Cl.$^6$ .................................................. C09D 11/02
[52] U.S. Cl. ........................... 106/31.58; 106/31.86; 106/31.29; 106/31.61
[58] Field of Search .......................... 106/20 R, 22 R, 106/20 D, 22 A, 31.58, 31.86, 31.29, 31.61

[56] References Cited

U.S. PATENT DOCUMENTS

| | | | |
|---|---|---|---|
| 4,490,731 | 12/1984 | Vaught | 346/140 R |
| 4,508,570 | 4/1985 | Fujii et al. | 106/20 D |
| 4,751,528 | 6/1988 | Spehrley, Jr. et al. | 346/140 R |
| 5,006,170 | 4/1991 | Schwarz | 106/20 R |
| 5,041,161 | 8/1991 | Cooke et al. | 106/22 A |
| 5,121,141 | 6/1992 | Hadimoglu et al. | 346/140 R |
| 5,211,747 | 5/1993 | Breton et al. | 106/20 R |
| 5,254,158 | 10/1993 | Breton et al. | 106/22 R |
| 5,389,143 | 2/1995 | Breton et al. | 106/20 D |
| 5,462,591 | 10/1995 | Karandikar et al. | 106/20 R |

*Primary Examiner*—Helene Klemanski
*Attorney, Agent, or Firm*—E. O. Palazzo

[57] ABSTRACT

An ink composition comprised of a colorant and a vehicle of a poly(alkylene oxide)-alkylate (I), a poly(alkylene oxide)-dialkylate (II), a polyoxa-alkanoate ester (III), or a polyoxa-alkanedioate diester (IV), and which ink possesses a viscosity of from about 1 centipoise to about 15 centipoise at a temperature of from about 125° C. to about 165° C., and which vehicle is of the formulas

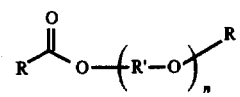

I

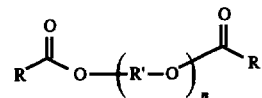

II

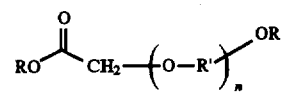

III

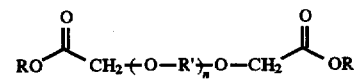

IV wherein R is alkyl, R' is an alkylene, or arylene, and n is an integer of from about 2 to about 20.

38 Claims, 1 Drawing Sheet

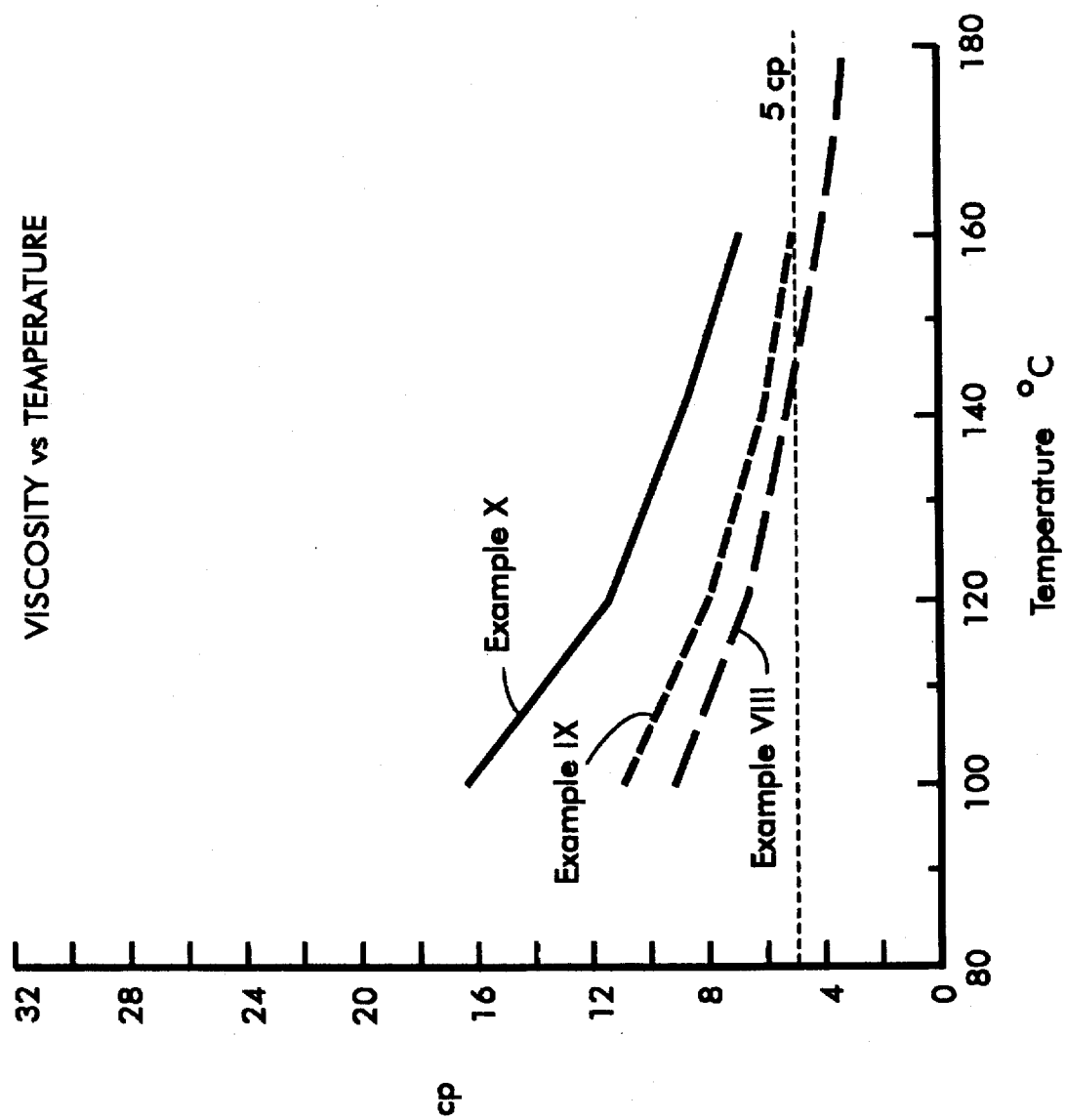

ACOUSTIC INK COMPOSITIONS

BACKGROUND OF THE INVENTION

The present invention is directed to ink compositions, and more specifically, the present invention relates to hot melt inks especially useful for acoustic ink printing, processes and apparatuses, reference for example U.S. Pat. Nos. 5,121,141, 5,111,220, 5,128,726, 5,371,531, U.S. Ser. Nos. 176,381, now abandoned, 285,572, now U.S. Pat. No. 5,528,384 the disclosures of each patent and each copending application being totally incorporated herein by reference, including especially acoustic ink processes as illustrated in the aforementioned copending applications and patents, such as an acoustic ink printer for printing images on a record medium.

More specifically, the present invention is directed to hot melt acoustic ink compositions wherein there can be generated with such inks excellent developed images with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention, there is provided the elimination, or minimization of undesirable paper curl since water is not present in the ink, or very small amounts thereof are selected in the invention inks, and it is preferred that there be an absence of water, and since water can be avoided in the inks a dryer is unnecessary thereby minimizing the cost of the acoustic ink jet apparatus and process. The inks of the present invention in embodiments thereof are comprised of a colorant, preferably a dye, and a vehicle, and more specifically, wherein the vehicle is a poly(alkylene oxide)-alkylate (I), poly(alkylene oxide)-dialkylate (II), polyoxaalkanoic ester (III) or a polyoxa-alkanedioic ester (IV) as illustrated by the formulas

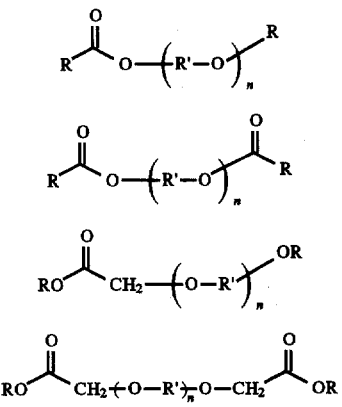

wherein R is a hydrocarbon, preferably an alkyl, of from about 1 to about 50 carbon atoms, or oxyethylene; R' is a hydrocarbon, preferably an alkylene with from about 2 to about 50 carbon atoms, or arylene with from about 7 to about 20 carbon atoms, such as phenylene; and n is an integer of 2 to 20. Examples of R include methyl, ethyl, propyl, isopropyl, butyl, isobutyl, neopentyl, hexyl, heptyl, octyl, nonyl, decyl, undecyl, dodecyl, tridecyl, hexadecyl, octadecyl, stearyl, lauryl, iso-octyl, and the like. Examples of R' include ethylene, methyl-ethylene, ethyl-ethylene, isopropylene, propyl-ethylene, butyl-ethylene, hexyl-ethylene, heptyl-ethylene, octyl-ethylene, nonyl-ethylene, decyl-ethylene, undecyl-ethylene, dodecyl-ethylene tridecyl-ethylene, hexadecyl-ethylene, octadecyl-ethylene, stearyl-ethylene, lauryl-ethylene, methylene, ethylene, propylene, butylene, hexylene, heptylene, octylene, nonylene, decylene, undecylene, dodecylene, tridecylene, hexadecylene, octadecylene, stearylene, phenylene, and methyl-phenylene.

In acoustic ink printing, the printhead produces approximately 2.2 picoliter droplets by an acoustic energy process. The ink under these conditions should display a melt viscosity of about 10 centipoise or less at the jetting temperature. Furthermore, once the ink is jetted onto the paper, the ink image should possess excellent crease properties, be nonsmearing waterfast, possess excellent transparency and excellent fix qualities. In selecting an ink for such applications, it is desirable that the vehicle display low melt viscosity, such as from about 1 centipoise to about 20, and preferably 1 to about 10 centipoise in the acoustic head, while also displaying solid-like properties after being jetted onto paper. Since the acoustic head can tolerate a temperature up to about 180° C., and preferably up to a temperature of from about 140° C. to about 160° C., the vehicle for the ink should display liquid-like properties such as a viscosity of 1 to about 10 centipoise at a temperature of from about 125° C. to about 165° C., and solidify or harden after jetting onto paper such that the ink displays a hardness value of from about 0.1 to 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature, so that the ink which is melted in the apparatus will not be subject to evaporation or spillage during periods of nonprinting. The vehicle selected to have a low critical temperature to permit the use of the solid ink is a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid having a wax-like consistency. These inks usually, thus as indicated herein, need to be heated to approximately 100° C. before the ink melts and is converted into a liquid. As with thermal ink jet, in acoustic ink jet a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly the situation when printing with color, Therefore, usually when printing with thermal ink, one needs to use coated papers, which are more expensive than plain paper.

One advantage of a hot melt ink jet is its ability to print on plain paper since the hot melt ink quickly solidifies as it cools and, since it is waxy in nature, and does not normally soak into a paper medium. However, hot melt ink jets can be cumbersome in structure and in design, for example the associated integrated electronics of a thermal ink jet head are considerably more compact than those of a hot melt ink jet head.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially nonheat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. Nos. 5,006,170 and 5,122,187, the disclosures of each of which are totally incorporated herein by reference, disclose hot melt ink compositions suitable for ink jet printing, which compositions comprise a colorant, a binder, and a propellant selected from the group consisting of hydrazine, cyclic amines, ureas, carboxylic acids, sulfonic acids, aldehydes, ketones, hydrocarbons, esters, phenols, amides, imides, halocarbons, urethanes, ethers, sulfones, sulfamides, sulfonamides, phosphites, phosphonates, phosphates, alkyl sulfides, alkyl acetates, and sulfur dioxide. Also disclosed are hot melt ink compositions suitable for ink jet printing which comprise a colorant, a propellant, and a binder selected from the group consisting of rosin esters, polyamides, dimer acid amides, fatty acid amides, epoxy resins, fluid paraffin waxes, fluid microcrystalline waxes, Fischer-Tropsch waxes, polyvinyl alcohol resins, polyols, cellulose esters, cellulose ethers, polyvinyl pyridine resins, fatty acids, fatty acid esters, polysulfonamides, benzoate esters, long chain alcohols, phthalate plasticizers, citrate plasticizers, maleate plasticizers, sulfones, polyvinyl pyrrolidinone copolymers, polyvinyl pyrrolidone/polyvinyl acetate copolymers, novalac resins, natural product waxes, mixtures of linear primary alcohols and linear long chain amides; and mixtures of linear primary alcohols and fatty acid amides. In one embodiment, the binder comprises a liquid crystalline material. The inks of the present invention, are dissimilar than the aforementioned '170 and '187 patents in that, for example, the invention vehicle selected displays a viscosity of from about 1 to about 10 centipoise when heated to a temperature of from about 125° C. to about 165° C. to enable, for example, the acoustic energy in the printhead to eject an ink droplet onto paper. Additionally, the vehicles of the present invention display softening points of from about 50° C. to about 100° C. Furthermore, the poly-(alkylene oxide)-alkylate (I), the poly-(alkylene oxide)-dialkylate (II), the polyoxa-alkanoic ester (III), or the polyoxa-alkanedioic ester selected for the inks of the present invention differ and are not disclosed or suggested, it is believed, in the aforementioned '170 or '187 patents.

U.S. Pat. No. 5,021,802, the disclosure of which is totally incorporated herein by reference, discloses a bubble jet ink which comprises 90 to 99.9 percent by weight of aqueous sol gel medium and 0.1 to 1 percent by weight colorant. The inks are thermally reversible sol gels which are gels at ambient temperatures and form liquid sols at temperatures between about 40° C. and 100° C.

U.S. Pat. No. 5,041,161, the disclosure of which is totally incorporated herein by reference, discloses an ink jet ink which is semi-solid at room temperature. These inks comprise vehicles, such as glyceryl esters, polyoxyethylene esters, waxes, fatty acids, and mixtures thereof, which are semi-solid at temperatures between 20° C. and 45° C. The ink is impulse jetted at an elevated temperature in the range of above 45° C. to about 110° C., at which temperature the ink has a viscosity of about 10 to 15 centipoise. The inks also contain 0.1 to 30 weight percent of a colorant system.

U.S. Pat. Nos. 4,853,036 and 5,124,718 disclose an ink for ink jet recording which comprises a liquid composition essentially comprising a coloring matter, a volatile solvent having a vapor pressure of 1 mm Hg or more at 25° C., and a material being solid at room temperature and having a molecular weight of 300 or more, and prepared so as to satisfy the formula $B_1/A_1 \geq 3$, assuming viscosity as $A_1$ cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167, the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084, the disclosure of which is totally incorporated herein by reference, discloses an ink jet ink in the form of a microemulsion of an organic vehicle phase comprising fatty acid and colorant dispersed therein and an aqueous phase containing a surfactant, the vehicle phase preferably being liquid at 70° C. and solid at 20° C.

U.S. Pat. No. 5,226,957, the disclosure of which is totally incorporated herein by reference, discloses water insoluble dyes formulated in a microemulsion-based ink which is waterfast, nonthreading, and bleed-alleviated. The inks include (a) about 0.05 to 0.75 weight percent of a high molecular weight colloid, (b) about 0.1 to 40 weight percent of at least two surfactants, comprising at least one surfactant and at least one cosurfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

While known compositions and processes are suitable for their intended purposes, a need remains for acoustic hot melt ink compositions suitable for thermal ink jet printing. In addition, there is a need for hot melt ink compositions which are compatible with a wide variety of plain papers. Further, there is a need for hot melt ink compositions which generate high quality, waterfast images on plain papers. There is also a need for hot melt ink jet ink compositions which generate high quality, fast-drying images on a wide variety of plain papers at low cost with high quality text and high quality graphics. Also, there is a need for hot melt ink jet ink compositions which exhibit minimal feathering. Additionally, there is a need for hot melt ink jet ink compositions which exhibit minimal intercolor bleed. There is also a need for hot melt ink jet ink compositions which exhibit excellent image permanence. Further, there is a need for hot melt ink jet ink compositions which are suitable for use in acoustic ink jet printing processes. Additionally, there is a need for hot ink compositions suitable for ink jet printing processes wherein the substrate, such as paper, is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate subsequent to printing is minimized, or avoided.

BRIEF DESCRIPTION OF THE DRAWING

Illustrated in FIG. 1 is a plot of viscosity in centipoise, Cp, versus temperature in degrees Centigrade for the inks indicated.

Reference is made to copending applications U.S. Ser. No. 624,154, filed concurrently herewith; U.S. Ser. No. 624,157 now U.S. Pat. No. 5,667,568, filed concurrently herewith; and U.S. Ser. No. 624,273, filed concurrently herewith; the disclosures of each application being incorporated herein by reference, illustrate acoustic ink compositions and processes thereof.

SUMMARY OF THE INVENTION

Examples of objects of the present invention include for example:

It is an object of the present invention to provide hot melt ink compositions with many of the advantages illustrated herein.

It is another object of the present invention to provide hot melt ink compositions suitable for acoustic ink jet printing.

It is yet another object of the present invention to provide hot melt ink compositions which are compatible with a wide variety of plain papers.

It is still another object of the present invention to provide hot melt ink compositions which generate high quality images on plain papers.

Another object of the present invention is to provide hot melt ink jet ink compositions comprised of a colorant, preferably a dye, and vehicle comprised of a poly(alkylene oxide)-alkylate (I), a poly(alkylene oxide)-dialkylate (II), a polyoxa-alkanoic ester, (III) or a polyoxa-dialkanoic ester (IV).

Yet another object of the present invention is to provide hot ink jet ink compositions which exhibit low viscosity of from about 1 to about 15, and preferably 10 centipoise at a temperature of from about 125° C. to about 165° C.

Still another object of the present invention is to provide hot melt ink jet ink compositions which exhibit minimal intercolor bleed.

It is another object of the present invention to provide hot melt ink jet ink compositions which exhibit excellent image permanence.

It is yet another object of the present invention to provide hot ink jet ink compositions that contain no water, and which are suitable for use in acoustic ink jet printing processes, and wherein in embodiments the vehicle is an economical alkylate terminated polyalkylene glycol, and wherein the inks in embodiments possess a viscosity of from about 5 to about 9 centipoise at 140° C.

It is still another object of the present invention to provide hot ink compositions that contain no water, and that are suitable for ink jet printing processes wherein the substrate is heated prior to printing and is cooled to ambient temperature subsequent to printing (also known as heat and delay printing processes).

Another object of the present invention is to provide ink compositions suitable for ink jet printing wherein high optical densities can be achieved with relatively low dye concentrations.

Yet another object of the present invention is to provide solvent free hot melt ink compositions suitable for ink jet printing wherein curling of the substrate subsequent to printing is minimized.

Another object of the present invention resides in the provision of hot melt inks wherein the viscosity of the ink is from about 1 centipoise to about 10 centipoise at, for example, the jetting temperature which can be from about 125° C. to about 180° C., preferably about 160° C., thereby enabling excellent jetting at reasonable power levels.

Further, in another object of the present invention there are provided hot melt inks with no water and vehicles, such as a poly(alkylene oxide)-alkylate (I) poly(alkylene oxide) -dialkylate (II), polyoxa-alkanoic ester (III), or a polyoxa-alkanedioic ester (IV), and a colorant such as a dye.

Additionally, in another object of the present invention there are provided hot melt inks with no water or solvent for ink printing methods and apparatuses, and wherein a number of the advantages as illustrated herein are achievable.

These and other objects of the present invention in embodiments thereof can be achieved by providing an ink composition which comprises a poly(alkylene oxide)-alkylate (I), poly(alkylene oxide)- dialkylate (II), polyoxa-alkanoic ester (III), or a polyoxa-alkanedioic ester (IV) and a dye, and optional known ink additives.

DETAILED DESCRIPTION OF THE INVENTION

In embodiments, the ink compositions of the present invention comprise a dye or pigment and the vehicle of the formulas illustrated herein, and wherein the dye is present in various effective amounts, such as from about 0.05 to about 30 weight percent, and the vehicle is present in an amount of from about 70 to about 99.95 weight percent. Embodiments of the present invention relate to ink compositions wherein the poly(alkylene oxide)-alkylate (I), the poly (alkylene oxide)-dialkylate (II), the polyoxa-alkanoate ester (III), or the polyoxa-alkanedioate diester (IV) possess a molecular weight, $M_w$, of from about 200 to about 2,000 grams per mole; said poly(alkylene oxide)-alkylate (I), or the poly(alkylene oxide)-dialkylate (II), the polyoxa-alkanote ester (III), or the polyoxa-alkanedioate diester (IV) is present in an amount of from about 60 to about 99 weight percent; R is 2'-methylpentyl, ethyleneoxyethyleneoxymethane, ethyleneoxyethyleneoxyoxyethylene-methane, ethyleneoxyethyleneoxyethyleneoxyethylenemethane; arylene contains from about 7 to about 24 carbon atoms; and said ink viscosity is about 5, 6 or 9 at 140° C.

Examples of poly(alkylene oxide)-bis-alkylate of the present invention include those of Formula (II), such as (ethyleneoxyethyteneoxyethylene)-diacetate, (ethyleneoxyethyleneoxyethyleneoxyethylene)-diacetate, (ethyleneoxyethyleneoxyethyleneoxyethyleneoxyethylene)-diacetate, (ethyleneoxyethyleneoxyethyleneoxyethyleneoxyethyleneoxyethylene)-diacetate, (ethyleneoxyethyleneoxyethylene)-distearate, (ethyleneoxyethyleneoxy-ethyleneoxyethylene)-distearate, (ethyleneoxyethyleneoxyethyleneoxyethyleneoxyethylene)-distearate, (ethyleneoxyethyleneoxyethyleneoxyethyleneoxyethyleneoxyethylene)-distearate, (ethyleneoxyethyleneoxyethylene)-dilaurate, (ethyleneoxyethyleneoxyethyleneoxyethylene)-dilaurate, (ethyleneoxyethyleneoxyethyleneoxyethyleneoxyethylene)-dilaurate, (ethyleneoxyethyleneoxyethyleneoxyethyleneoxyethyleneoxyethylene)-dilaurate, (propyleneoxypropyleneoxypropylene)-diacetate, (propyleneoxypropyleneoxypropyleneoxypropylene)-diacetate, (propyleneoxypropyleneoxypropyleneoxypropyleneoxypropylene)-diacetate, (propyleneoxypropyleneoxypropyleneoxypropyleneoxypropyleneoxypropylene)-diacetate, (propyleneoxypropyleneoxy-proyplene)-distearate, (propyleneoxypropyleneoxypropyleneoxy-propylene)-distearate, (propyleneoxypropyleneoxypropyleneoxypropyleneoxy-propylene)-distearate, (propyleneoxypropyleneoxy-propyleneoxypropyleneoxypropyleneoxy-propyleneoxy-propylene)-distearate, (propyleneoxypropyleneoxypropylene)-dilaurate, (propyleneoxy-propyleneoxypropyleneoxypropylene)-dilaurate, (propyleneoxy-propyleneoxypropyleneoxy-propyleneoxy-propylene)-dilaurate, or (propyleneoxypropyleneoxy-propylene-oxypropyleneoxypropyleneoxypropylene)-dilaurate, and which component is present in various effective amounts, such as from about 80 to about 97 percent by weight, of the ink.

Examples of poly(alkylene oxide)-alkylate of the present invention include those of Formula (I), such as (ethyleneoxyethyleneoxyethylene)-acetate, (ethyleneoxyethyleneoxyethyleneoxyethylene)-acetate, (ethyleneoxyethyleneoxyethyleneoxyethyleneoxyethylene)-acetate, (ethyleneoxyethyleneoxyethyleneoxyethyleneoxyethyleneoxyethylene)-acetate, (ethyleneoxyethyleneoxyethylene)-stearate, (ethyleneoxyethyleneoxyethyleneoxyethylene)-stearate, (ethyleneoxyethyleneoxyethyleneoxyethyleneoxyethylene)-stearate, (ethyleneoxyethyleneoxyethyleneoxyethyleneoxyethyleneoxyethylene)-stearate, (ethyleneoxyethyteneoxyethylene)-laurate, (ethyleneoxyethyleneoxyethyleneoxyethylene)-laurate, (ethyleneoxyethyleneoxyethyleneoxyethyleneoxyethylene)-laurate, (ethyleneoxyethyleneoxyethyleneoxyethyleneoxyethyleneoxyethylene)-laurate, (propyleneoxypropyleneoxypropylene)-acetate, (propyleneoxypropyleneoxypropyleneoxypropylene)-acetate, (propyleneoxypropyleneoxypropyleneoxypropyleneoxypropylene)-acetate, (propyleneoxypropyleneoxypropyleneoxypropyleneoxypropyleneoxypropylene)-acetate, (propyleneoxypropyleneoxypropylene)-stearate, (propyleneoxypropyleneoxypropyleneoxypropylene)-stearate, (propyleneoxypropyleneoxypropyleneoxypropyleneoxypropylene)-stearate, (propyleneoxypropyleneoxypropyleneoxypropyleneoxypropylene)-stearate, (propyleneoxypropyleneoxy-propyleneoxypropylene)-stearate, (propyleneoxypropyleneoxypropylene)-laurate, (propyleneoxypropyleneoxy-propyleneoxypropylene)-laurate, (propyleneoxy-propyleneoxypropyleneoxypropylene)-laurate, (propyleneoxy-propyleneoxypropyleneoxypropyleneoxypropylene)-laurate, or (propyleneoxypropyleneoxypropyleneoxy-propyleneoxypropyleneoxy-propyleneoxypropylene)-laurate, and which component is present in various effective amounts, such as from about 80 to about 97 percent by weight (or parts throughout), of the ink.

Examples of polyoxa alkanoates of the present invention include those of Formula (III), such as methyl 3,6-dioxaheptanoate, ethyl 3,6-dioxaheptanoate, methyl 3,6-dioxaheptanoate, ethyl 3,6-dioxaheptanoate, propyl 3,6-dioxaheptanoate, butyl 3,6-dioxaheptanoate, isopropyl 3,6-dioxaheptanoate, isobutyl 3,6-dioxaheptanoate, neopentyl 3,6-dioxaheptanoate, hexyl 3,6-dioxaheptanoate, heptyl 3,6-dioxaheptanoate, octyl 3,6-dioxaheptanoate, nonyl 3,6-dioxaheptanoate, decyl 3,6-dioxaheptanoate, dodecyl 3,6-dioxaheptanoate, stearyl 3,6-dioxaheptanoate, methyl 3,6,9-trioxadecanoate, ethyl 3,6,9-trioxadecanoate, propyl 3,6,9-trioxadecanoate, butyl 3,6,9-trioxadecanoate, isopropyl 3,6,9-trioxadecanoate, isobutyl 3,6,9-trioxadecanoate, neopentyl 3,6,9-trioxadecanoate, hexyl 3,6,9-trioxadecanoate, heptyl 3,6,9-trioxadecanoate, octyl 3,6,9-trioxadecanoate, nonyl 3,6,9-trioxadecanoate, decyl 3,6,9-trioxadecanoate, dodecyl 3,6,9-trioxadecanoate, stearyl 3,6,9-trioxadecanoate, or lauryl 3,6,9-trioxadecanoate, and which component is present in various effective amounts, such as from about 80 to about 97 percent by weight (or parts throughout), of the ink.

Examples of polyoxa alkanedioates of the present invention include those of the Formula (IV), such as dimethyl 3,6,9-trioxaundecanedioate, diethyl 3,6,9-trioxaundecanedioate, dipropyl 3,6,9-trioxaundecanedioate, dibutyl 3,6,9-trioxaundecanedioate, diisopropyl 3,6,9-trioxaundecanedioate, diisobutyl 3,6,9-trioxaundecanedioate, dineopentyl 3,6,9-trioxaundecanedioate, dihexyl 3,6,9-trioxaundecanedioate, diheptyl 3,6,9-trioxaundecanedioate, dioctyl 3,6,9-trioxaundecanedioate, dinonyl 3,6,9-trioxaundecanedioate, didecyl 3,6,9-trioxaundecanedioate, didodecyl 3,6,9-trioxaundecanedioate, distearyl 3,6,9-trioxaundecanedioate, or dilauryl 3,6,9-trioxaundecanedioate, and which component is present in various effective amounts, such as from about 80 to about 97 percent by weight, of the ink.

The ink vehicle is selected in various effective amounts as illustrated herein, such as, for example, from about 70 to about 99, or from about 80 to about 97 percent by weight of the ink composition.

Examples of colorants, preferably dyes, selected for the inks of the present invention are known and include those as illustrated in U.S. Pat. No. 5,310,887, the disclosure of which is totally incorporated herein by reference, and include, for example, reference the Color Index, Resorcin Crystal Violet, Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081: Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasol Red 2 BL, Intraplast Red G (Orasol Red), Savinyl Red BLSN, Savinyl Scarlet RLS, Savinyl Fire Red 3GLS, and Zapon Red 335; cyan dyes Orasol Blue 2 GLN, Neozapon Blue 807, Savinyl Blue RLS, Savinyl Blue GLS, Orasol Blue GN, and RBX3LV dye available from Milliken Chemicals, Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Victoria Blue R, available from Bayer AG, Leverkusen, Germany, Morfast Blue 100, Morfast Red 104, and Morfast Red 100, available from Morton International Specialty Chemicals Group, Chicago, Ill.; and mixtures thereof; and the like with preferred dyes in embodiments including Reactint Black 57AB, Reactint Black X40LV, Reactint Blue 17AB, Reactint Blue X3LV, Reactint Blue X19, Reactint Red X26B-50, Reactint Red X520, Reactint Violet X80LT, Reactint Orange X38, and Reactint Yellow X15, all available from Milliken Chemicals. Typically, the dye is present in the ink in an amount of from about 0.01 to about 10 percent by weight, preferably from about 0.05 to about 4 percent by weight, and more preferably from about 0.1 to about 3 percent by weight, although the amount can be outside these ranges.

Other optional ink additives include biocides, such as Dowicil 150, 200, and 75, benzoate salts, sorbate salts, and the like, present in effective amounts such as, for example, an amount of from about 0.0001 to about 4 percent by weight, and preferably from about 0.01 to about 2.0 percent by weight, and pH controlling agents, such as acids or, bases, phosphate salts, carboxylates salts, sulfite salts, amine salts, and the like, present in an amount of, for example, from 0 to about 1 percent by weight and preferably from about 0.01 to about 1 percent by weight, or the like.

The inks of the present invention can be prepared by any suitable method. For example, the inks can be prepared by gently stirring or shaking the individual components, such as melt mixing the vehicle with a colorant at a temperature of from about 90° C. to about 130° C., followed by cooling to about 25° C.

The inks of the present invention, preferably with a viscosity of from about 1 to about 15, and from about 5 to about 10, are particularly suitable for printing processes wherein the substrate, such as paper, transparency material, or the like, is heated during the printing process to facilitate formation of the liquid crystalline phase within the ink. Preferably, the substrate is heated to a high temperature to enable rapid ink drying without damaging the substrate, such as paper. When transparency substrates are employed, temperatures typically are limited to a maximum of about 100° C. to about 110° C. since the polyester usually employed as the base in transparency sheets tends to deform at higher temperatures. Specially formulated transparencies and paper substrates can, however, tolerate higher temperatures, frequently being suitable for exposure to temperatures of 150° C. or even 200° C. in some instances. Heating temperatures are from about 40° C. to about 165° C., and preferably from about 125° C. to about 165° C.

The inks of the present invention are particularly suitable for use in acoustic ink jet printing processes. In acoustic ink jet printing, reference the patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference for example K. A. Krause, "Focusing Ink Jet Head," IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension, which in turn causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Without concern for the timing mechanism employed, the size of the ejected droplets is determined by the waist diameter of the focused acoustic beam. Acoustic ink printing is attractive since it does not usually require the nozzles or the small ejection orifices which have caused many of the reliability and pixel placement accuracy problems that conventional drop on demand and continuous stream ink jet printers have suffered. The size of the ejection orifice is an important design parameter of an ink jet because it determines the size of the droplets of ink that the jet ejects. As a result, the size of the ejection orifice cannot be increased without sacrificing resolution. Acoustic ink printers embodying printheads comprising acoustically illuminated spherical focusing lenses can print precisely positioned pixels (picture elements) at resolutions which are sufficient for high quality printing of relatively complex images. The size of the individual pixels printed by such a printer can be varied over a significant range during operation, thereby accomodating, for example, the printing of variably shaded images. Furthermore, the known droplet ejector technology can be adapted to a variety of printhead configurations including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (single ejector/pixel/line) for ordinary line printing. Inks suitable for acoustic ink jet printing typically are liquid at ambient temperatures (about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. Nos. 4,308,547, 4,697,195, 5,028,937, 5,041,849, 4,751,529, 4,751,530, 4,751,534, 4,801,953, and 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

One embodiment of the present invention is directed to a process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, the radiation being brought to focus with a finite waist diameter in a focal plane; and (b) causing droplets of said ink to be ejected onto a recording sheet in an imagewise pattern.

The poly(alkylene oxide)-alkylate (I) vehicle can be prepared by reacting an organic acid with a poly(alkylene oxide) monoalkyl terminated compound by a condensation process. In embodiments of the present invention, the poly(alkylene oxide)-alkylate (I) is prepared, for example, by charging a reactor, such as a 300 milliliter Parr reactor equipped with a distillation apparatus, with from about 1 mole equivalent of an acid, such as stearic acid or lauric acid, with about 1 mole equivalent of a poly(alkylene oxide) monoalkyl terminated, such as poly(ethylene glycol), mono methyl ether of molecular weight of about 350 grams per mole (available from Aldrich), and a condensation catalyst, such as dibutylstannoic acid, at a temperature of from about 150° C. to about 185° C. with stirring for a duration of from about 3 to about 6 hours. During this time, water is collected as a byproduct in the distillation receiver. The pressure of the reaction mixture is then reduced from atmospheric pressure to about 1 millimeter Hg, and the reaction temperature raised to about 210° C. for about 1 to 3 hours. The mixture is then pressurized to atmospheric pressure and poured into a pan and allowed to cool to room temperature. Other invention vehicles (I) can be prepared in a similar manner.

Similarly, the poly(alkylene oxide)-dialkylate (II) vehicle can be prepared by reacting an organic acid with a poly(alkylene oxide) compound by a condensation process. In one embodiment, the preparation involves charging a reactor, such as a 300 milliliter Parr reactor equipped with a distillation apparatus, with from about 2 mole equivalent of an acid, such as stearic acid or lauric acid, with about 1 mole equivalent of a poly(alkylene oxide), such as poly(ethylene oxide) or poly(ethylene glycol) or poly(propylene oxide) and a condensation catalyst, such as dibutylstannoic acid, at a temperature of from about 150° C. to about 185° C. with stirring for a duration of from about 3 to about 6 hours. During this time, water is collected as a byproduct in the distillation receiver. The pressure of the reaction mixture is then reduced from atmospheric pressure to about 1 millimeter Hg, and the reaction temperature raised to about 210° C. for about 1 to 3 hours, and the mixture is then pressurized to atmospheric pressure and poured into a pan, and allowed to cool to room temperature. Other invention vehicles (II) can be prepared in a similar manner.

The polyoxa-alkanoate ester (III) vehicle can be prepared by reacting an organic acid with an organic alcohol compound by a condensation-process. In one embodiment, the preparation includes charging a reactor, such as a 300 milliliter Parr reactor equipped with a distillation apparatus, with from about 1 mole equivalent of an acid, such as 3,6-dioxaheptanoic acid or 3,6,9-trioxadecanoic acid available from Hoechst, with about 1 or more mole equivalents of an alkyl alcohol, such as butanol or stearyl alcohol, and a condensation catalyst, such as dibutylstannoic acid, at a temperature of from about 150° C. to about 185° C. with stirring for a duration of from about 3 to about 6 hours. During this time, water is collected as a byproduct in the distillation receiver. The pressure of the reaction mixture is then reduced from atmospheric pressure to about 1 millimeter Hg, and the reaction temperature raised to about 210° C. for about 1 to 3 hours, and the mixture is then pressurized to atmospheric pressure and poured into a pan and allowed to cool to room temperature. Other invention vehicles (III) can be prepared in a similar manner.

Similarly, the polyoxa-alkanedioate diester (IV) vehicle is prepared by reacting an organic diacid with an organic alcohol compound by a condensation process. In one embodiment, the preparation includes charging a reactor, such as a 300 milliliter Parr reactor equipped with a distillation apparatus, with from about 1 mole equivalent of a diacid, such as 3,6,9-trioxaundecanedioic acid or polyglycol diacid available from Hoechst, with about 1 or more mole equivalent of an alkyl alcohol, such as butanol or stearyl alcohol, and a condensation catalyst, such as dibutylstannoic acid, at a temperature of from about 150° C to about 185° C. with stirring for a duration of from about 3 to about 6 hours. During this time, water is collected as a byproduct in the distillation receiver. The pressure of the reaction mixture is then reduced from atmospheric pressure to about 1 millimeter Hg, and the reaction temperature raised to about 210° C. for about 1 to 3 hours, and the mixture is then pressurized to atmospheric pressure and poured into a pan, and allowed to cool to room temperature. Other invention vehicles (IV) can be prepared in a similar manner.

The organic acid utilized in the preparation of the poly(alkylene oxide)-alkylate (I) or poly(alkylene oxide)-dialkylate (II) is known and includes acetic acid, ethanoic acid, propionoic acid, butanoic acid, pentanoic acid, heptanoic acid, octanoic acid, decanoic acid, dodecanoic acid, stearic acid, lauric acid, mixture thereof and like, and which reactant is utilized in an amount, for example, of from 0.45 mole equivalent of poly(alkylene oxide)-alkylate (I) to about 0.55 mole equivalent of poly(alkylene oxide)-alkylate (I), and from about 0.25 mole equivalent of poly(alkylene oxide)-dialkylate (II) to about 0.5 mole equivalent of poly(alkylene oxide)-dialkylate (II).

The organic diol utilized in the preparation of the poly(alkylene oxide)-alkylate (I) is known and includes poly(ethylene oxide) methyl ether, poly(ethylene oxide) ethyl ether, poly(ethylene oxide) propyl ether, poly(ethylene oxide) butyl ether, poly(ethylene oxide) stearyl ether, poly(ethylene oxide) lauryl ether, poly(propylene oxide) methyl ether, poly(propylene oxide) ethyl ether, poly(propylene oxide) propyl ether, poly(propylene oxide) butyl ether, poly(propylene oxide) stearyl ether, and poly(propylene oxide) lauryl ether of molecular weights ranging, for example, from about 200 to about 2,000 grams per mole, mixtures thereof and the like, and is utilized in an amount, for example, of from about 0.5 mole equivalent of poly(alkylene oxide)-alkylate (I) to about 0.75 mole equivalent of poly(alkylene oxide)-alkylate (I).

The organic diol selected for the preparation of the poly(alkylene oxide)-dialkylate (II) is known and includes poly(ethylene oxide), poly(propylene oxide), poly(butylene oxide) of molecular weights ranging from about 200 to about 2,000 grams per mole, mixtures thereof and like, and is utilized in an amount of from about 0.5 mole equivalent of poly(alkylene oxide)-dialkylate (II) to about 0.75 mole equivalent of poly(alkylene oxide)-dialkylate (II).

The organic acid selected for the preparation of the polyoxa-alkanoate (III) is known, and includes 3,6- dioxaheptanoic acid and 3,6,9-trioxadecanoic acid available from Hoechst Celanese, and is utilized, for example, in an amount of, for example, from about 0.5 mole equivalent of polyoxa-alkanoate (III).

The organic diacid utilized in the preparation of the polyoxa-alkanedioate (IV) includes 3,6,9-trioxaundecanedioic acid and polyglycol diacid available from Hoechst Celanese, and is utilized in an amount of from about 0.5 to about 0.75 mole equivalent of polyoxa-alkanoate (IV).

The organic alcohol utilized in the preparation of polyoxa-alkanoate (III) or the polyoxa-alkanedioate (IV) is known and includes methanol, ethanol, propanol, butanol, isopropanol, isobutanol, pentanol, hexanol, heptanol, octanol, dedecanol, dodecanol, neopentanol, stearyl alcohol, lauryl alcohol, mixture thereof and the like, and which alcohol is utilized, for example, in an amount of from about 0.5 mole equivalent of polyoxa-alkanoate (IV), and from 0.25 to about 0.5 mole equivalent of polyoxa-alkanoate (III).

The condensation catalyst utilized in the preparation of poly(alkylene oxide)-alkylate CD or poly(alkylene oxide)-dialkylate (II), polyoxa-alkanoate (I) or the polyoxa-alkanedioate (IV) is known, and includes tin oxide, butylstannoic acid available from Elf Altochem as FASCAT 4100, titanium (IV) tetraisopropoxide, titanium (IV) tetrabutoxide, zinc acetate, magnesium acetate, antimony oxide, zirconium acetate, lead oxide, tetrabutyl ammonium phosphate, mixtures thereof, and the like, and which catalyst is selected, for example, in an amount of from about 0.01 to about 0.1 mole equivalent of product.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE I

Synthesis of poly(ethylene oxide)-distearate of a molecular weight of 930 grams per mole was prepared from polyethylene oxide (400 grams per mole) with stearic acid as follows.

A 1 liter Parr reactor equipped with a mechanical stirrer, and a distillation apparatus was charged with 200 grams of polyethylene oxide (400 molecular weight) available from Aldrich Chemical Company, 284 grams of stearic acid and 0.5 gram of butyl stannoic acid available as FASCAT 4100 from ALF-Atochem. The mixture was then heated to 165° C. for a duration of 2 hours, followed by heating to 195° C. for a duration of 6 hours, after which the pressure was reduced from atmospheric pressure to about 1 millimeter Hg, and maintained for an additional hour. Water was collected in the distillation receiver during this process and amounted to about 15 grams. The mixture was then pressurized to atmospheric pressure and the product, poly(ethylene oxide)-distearate, was discharged from the bottom drain and cooled to room temperature (about 25° C. throughout the Examples).

EXAMPLE II

Synthesis of poly(ethylene oxide)-distearate of a molecular weight of 1,130 grams per mole was prepared from polyethylene oxide (600 grams per mole) with stearic acid as follows.

A 1 liter Parr reactor equipped with a mechanical stirrer and a distillation apparatus was charged with 300 grams of polyethylene oxide (600 molecular weight) available from Aldrich Chemical Company, 284 grams of stearic acid and 0.5 gram of butyl stannoic acid available as FASCAT 4100 from ALF-Atochem. The mixture was then heated to 165° C. for a duration of 2 hours, followed by heating to 195° C. for a duration of 6 hours, after which the pressure was reduced from atmospheric pressure to about 1 millimeter Hg, and maintained for an additional hour. Water was collected in the distillation receiver during this process and amounted to about 15 grams. The mixture was then pressurized to atmospheric pressure and the product, poly(ethylene oxide)-distearate was discharged from the bottom drain and cooled to room temperature.

EXAMPLE III

Synthesis of poly(ethylene oxide)-distearate of molecular weight of 1,530 grams per mole was prepared from polyethylene oxide (1,000 grams per mole) with stearic acid as follows.

A 1 liter Parr reactor equipped with a mechanical stirrer and a distillation apparatus was charged with 500 grams of polyethylene oxide (1,000 molecular weight) available from Aldrich Chemical Company, 284 grams of stearic acid, and 0.5 gram of butyl stannoic acid available as FASCAT 4100 from ALF-Atochem. The resulting mixture was then heated to 165° C. for a duration of 2 hours, followed by heating to 195° C. for a duration of 6 hours, after which the pressure was reduced from atmospheric pressure to about 1 millimeter Hg, and maintained for an additional hour at this pressure. Water was collected in the distillation receiver during this process and amounted to about 15 grams. The mixture was then pressurized to atmospheric pressure and the product, poly(ethylene oxide)-distearate, was discharged from the bottom drain and cooled to room temperature.

EXAMPLE IV

Synthesis of poly(ethylene oxide)-stearate of molecular weight of 1,400 grams per mole was prepared from polyethylene oxide monomethyl ether (350 grams per mole) with stearic acid as follows.

A 1 liter Parr reactor equipped with a mechanical stirrer and a distillation apparatus was charged with 350 grams of polyethylene oxide monomethyl ether (350 molecular weight) available from Aldrich Chemical Company, 284 grams of stearic acid, and 0.5 gram of butyl stannoic acid available as FASCAT 4100 from ALF-Atochem. The resulting mixture was then heated to 165° C. for a duration of 2 hours, followed by heating to 195° C. for a duration of 6 hours, after which the pressure was reduced from atmospheric pressure to about 1 millimeter Hg, and maintained for an additional hour. Water was collected in the distillation receiver during this process and amounted to about 15 grams. The mixture was then pressurized to atmospheric pressure and the product, poly(ethylene oxide)-distearate, was discharged from the bottom drain and cooled to room temperature, about 25° C.

EXAMPLE V

Synthesis of stearyl 3,6-dioxaheptanoate was prepared from 3,6-dioxaheptanoic acid with stearyl alcohol as follows.

A 1 liter Parr reactor equipped with a mechanical stirrer and a distillation apparatus was charged with 268 grams of 3,6-dioxaheptanoic acid available from Hoechst Celanese, 646 grams of stearyl alcohol and 0.5 gram of butyl stannoic acid available as FASCAT 4100 from ALF-Atochem. The resulting mixture was then heated to 165° C. for a duration of 2 hours, followed by heating to 195° C. for a duration of 6 hours, after which the pressure was reduced from atmospheric pressure to about 1 millimeter Hg, and maintained for an additional hour. Water was collected in the distillation receiver during this process and amounted to about 15 grams. The mixture was then pressurized to atmospheric pressure and the product, stearyl 3,6-dioxaheptanoate, was discharged from the bottom drain and cooled to room temperature.

EXAMPLE VI

Synthesis of stearyl 3,6,9-trioxadecanoate was prepared from 3,6,9-trioxadecanoic acid with stearyl alcohol as follows.

A 1 liter Parr reactor equipped with a mechanical stirrer and a distillation apparatus was charged with 178 grams of 3,6,9-trioxadecanoic acid available from Hoechst Celanese, 256 grams of stearyl alcohol, and 0.5 gram of butyl stannoic acid available as FASCAT 4100 from ALF-Atochem. The mixture was then heated to 165° C. for a duration of 2 hours, followed by heating to 195° C. for a duration of 6 hours, after which the pressure was reduced from atmospheric pressure to about 1 millimeter Hg, and maintained for an additional hour. Water was collected in the distillation receiver during this process and amounted to about 15 grams. The mixture was then pressurized to atmospheric pressure and the product, stearyl 3,6,9-trioxadecanoate, was discharged from the bottom drain and cooled to room temperature.

EXAMPLE VII

Synthesis of distearyl 3,6,9-trioxaundecanedioate was prepared from 3,6,9-trioxaundecanedioic acid with stearyl alcohol as follows.

A 1 liter Parr reactor equipped with a mechanical stirrer and a distillation apparatus was charged with 222 grams of 3,6,9-trioxaundecanedioic acid available from Hoechst Celanese, 512 grams of stearyl alcohol, and 0.5 gram of butyl stannoic acid available as FASCAT 4100 from ALF-Atochem. The resulting mixture was then heated to 165° C for a duration of 2 hours, followed by heating to 195° C. for a duration of 6 hours, after which the pressure was reduced from atmospheric pressure to about 1 millimeter Hg, and maintained for an additional hour. Water was collected in the distillation receiver during this process and amounted to about 15 grams. The mixture was then pressurized to atmospheric pressure and the product, distearyl 3,6,9-trioxaundecanedioate, was discharged from the bottom drain and cooled to room temperature.

EXAMPLE VIII to X

A series of blue inks were then formulated by mixing 5 percent by weight of RBX3LV dye available from Milliken Chemicals with 95 percent by weight of the selected vehicles (Table 1) at 140° C. for 5 minutes, followed by cooling to room temperature. The rheological characterization was performed using Carri-Med CSL-100 controlled stress rheometer using a 4 centimeter, 2 degree cone and plate geometry. The measurement consisted of 5 consecutive shear rate sweeps, up to the maximum rate of 1,250 s$^{-1}$ and at a temperature of 100° C. to 180° C. increments. The infinite shear viscosity was then plotted as a function of temperature (FIG. 1).

TABLE 1

| EXAMPLE | VEHICLE | VISCOSITY (centipoise) of Vehicle at 140° C. |
|---|---|---|
| Example VIII | Example I | 5.2 |
| Example IX | Example II | 6.3 |
| Example X | Example III | 9.0 |

Also, it is believed that similar inks can be prepared with Savinyl Blue GLS of the dye instead of RBX3LV dye.

The inks of the present invention were selected for the development of images in an acoustic ink jet printer test fixture, and there resulted inks, it is believed, of excellent resolution, excellent waterfastness, acceptable optical densities, superior color, and wherein the paper substrate did not curl for an extended period of, for example, about one month.

Other embodiments and modifications of the present invention may occur to those of ordinary skill in the art subsequent to a review of the present application and the information presented herein; these embodiments and modifications, as well as equivalents thereof, are also included within the scope of this invention.

What is claimed is:

1. An ink composition comprised of a colorant and a vehicle of a poly(alkylene oxide)-alkylate (I), a poly(alkylene oxide)-dialkylate (II), a polyoxa-alkanoic ester (III), or a polyoxa-alkaneoic diester (IV), and which ink possesses a viscosity of from about 1 centipoise to about 15 centipoise at a temperature of from about 125° C. to about 165° C., and which vehicle is of the formulas

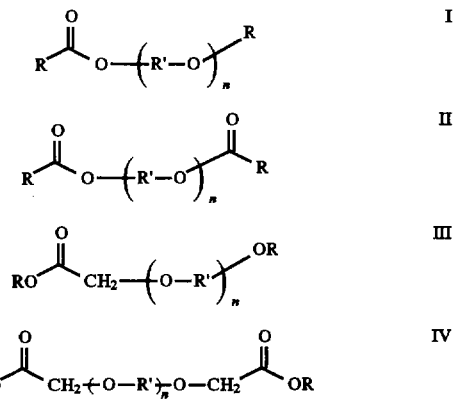

wherein R is alkyl, R' is an alkylene, or arylene, and n is an integer of from about 2 to about 20.

2. An ink composition in accordance with claim 1 wherein the poly(alkylene oxide)-alkylate (I), the poly(alkylene oxide)-dialkylate (II), the polyoxa-alkanoic ester (III), or the polyoxa-alkanedoic diester (IV) possesses a molecular weight, $M_w$, of from about 200 to about 2,000 grams per mole.

3. An ink composition in accordance with claim 1 wherein the ink is a solid at a temperature of from about 20° C. to about 40° C.

4. An ink composition in accordance with claim 1 wherein the colorant is a dye, and the ink possesses a viscosity of from about 1 to about 10.

5. An ink composition in accordance with claim 1 wherein said poly(alkylene oxide)-dialkylate of Formula (II), is (ethyleneoxyethyleneoxyethylene)-diacetate, (ethyleneoxyethyleneoxy-ethyleneoxyethylene)-diacetate, (ethyleneoxyethyleneoxyethyleneoxy-ethyleneoxyethylene)-diacetate, (ethyleneoxyethyleneoxyethyleneoxyethyleneoxyethyleneoxyethylene)-diacetate, (ethyleneoxyethylene-oxyethylene)-distearate, (ethyleneoxyethyleneoxyethyleneoxyethylene)-distearate, (ethyleneoxyethyleneoxyethyleneoxyethyleneoxyethylene)-distearate, (ethyleneoxyethyleneoxyethyleneoxyethyleneoxy-ethyleneoxyethylene)-distearate, (ethyleneoxyethyleneoxyethylene)-dilaurate, (ethyleneoxyethyleneoxyethyleneoxyethylene)-dilaurate, (ethyleneoxyethyleneoxyethyleneoxyethyleneoxyethylene)-dilaurate, (ethyleneoxyethyleneoxyethyleneoxyethyleneoxyethyleneoxyethylene)-dilaurate, (propyleneoxypropyleneoxypropylene)-diacetate, (propyleneoxypropyleneoxypropyleneoxypropylene)-diacetate, (propyleneoxypropyleneoxypropyleneoxypropyleneoxypropylene)-diacetate, (propyleneoxypropyleneoxypropyleneoxypropyleneoxypropyleneoxypropylene)-diacetate, (propyleneoxypropyleneoxy-propylene)-distearate, (propyleneoxypropyleneoxypropylene-oxypropylene)-distearate, (propyleneoxypropyleneoxy-propyleneoxypropyleneoxypropylene)-distearate, or (propyleneoxypropyleneoxy-propyleneoxypropyleneoxypropyleneoxy-propylene)-distearate.

6. An ink composition in accordance with claim 1 wherein said poly(alkylene oxide)-alkylate of formula (I), is (ethyleneoxyethyleneoxyethylene)-acetate, (ethyleneoxyethyleneoxyethyleneoxyethylene)-acetate, (ethyleneoxyethyleneoxyethyleneoxyethyleneoxyethylene)-acetate, (ethyleneoxyethyleneoxyethyleneoxyethyleneoxyethyleneoxyethylene)-acetate, (ethyleneoxyethyleneoxyethylene)-stearate, (ethyleneoxyethyleneoxyethyleneoxyethylene)-stearate, (ethyleneoxyethyleneoxyethyleneoxyethyleneoxyethylene)-stearate, (ethyleneoxyethyleneoxyethyleneoxyethyleneoxyethyleneoxyethylene)-stearate, (ethyleneoxyethyleneoxyethylene)-laurate, (ethyleneoxyethyleneoxyethyleneoxyethylene)-laurate, (ethyleneoxyethyleneoxyethyleneoxyethyleneoxyethylene)-laurate, (ethyleneoxyethyleneoxyethyleneoxyethyleneoxyethyleneoxyethylene)-laurate, (propyleneoxypropyleneoxypropylene)-acetate, (propyleneoxypropyleneoxypropyleneoxyproplene)-acetate, (propyleneoxypropyleneoxypropyleneoxypropyleneoxypropylene)-acetate, (propyleneoxypropyleneoxypropyleneoxypropyleneoxypropyleneoxy-propylene)-acetate, (propyleneoxypropyleneoxypropylene)-stearate, (propyleneoxypropyleneoxypropyleneoxypropylene)-stearate, (propyleneoxypropyleneoxypropyleneoxypropyleneoxypropylene)-stearate, (propyleneoxypropyleneoxypropyleneoxypropyleneoxypropyleneoxypropylene)-stearate, (propyleneoxypropyleneoxyproplene)-laurate, (propyleneoxypropyleneoxypropyleneoxypropylene)-laurate, (propyleneoxypropyleneoxypropyleneoxypropyleneoxypropylene)-laurate, or (propyleneoxypropyleneoxypropyleneoxypropyleneoxy-propyleneoxypropylene)-laurate.

7. An ink composition in accordance with claim 1 wherein said polyoxa-alkanoic ester of Formula (III) is methyl 3,6-dioxaheptanoate, ethyl 3,6-dioxaheptanoate, methyl 3,6-dioxaheptanoate, ethyl 3,6-dioxaheptanoate, propyl 3,6-dioxaheptanoate, butyl 3,6-dioxaheptanoate, isopropyl 3,6-dioxaheptanoate, isobutyl 3,6-dioxaheptanoate, neopentyl 3,6-dioxaheptanoate, hexyl 3,6-dioxaheptanoate, heptyl 3,6-dioxaheptanoate, octyl 3,6-dioxaheptanoate, nonyl 3,6-dioxaheptanoate, decyl 3,6-dioxaheptanoate, dodecyl 3,6-dioxaheptanoate, stearyl 3,6-dioxaheptanoate, methyl 3,6,9-trioxadecanoate, ethyl 3,6,9-trioxadecanoate, propyl 3,6,9-trioxadecanoate, butyl 3,6,9-trioxadecanoate, isopropyl 3,6,9-trioxadecanoate, isobutyl 3,6,9-trioxadecanoate, neopentyl 3,6,9-trioxadecanoate, hexyl 3,6,9-trioxadecanoate, heptyl 3,6,9-trioxadecanoate, octyl 3,6,9-trioxadecanoate, nonyl 3,6,9-trioxadecanoate, decyl 3,6,9-trioxadecanoate, dodecyl 3,6,9-trioxadecanoate, stearyl 3,6,9-trioxadecanoate, or lauryl 3,6,9-trioxadecanoate.

8. An ink composition in accordance with claim 1 wherein said polyoxa-alkanedioic of Formula (IV) is dimethyl 3,6,9-trioxaundecanedioate, diethyl 3,6,9-trioxaundecanedioate, dipropyl 3,6,9-trioxaundecanedioate, dibutyl 3,6,9-trioxaundecanedioate, diisopropyl 3,6,9-trioxaundecanedioate, diisobutyl 3,6,9-trioxaundecanedioate, dineopentyl 3,6,9-trioxaundecanedioate, dihexyl 3,6,9-trioxaundecanedioate, diheptyl 3,6,9-trioxaundecanedioate, dioctyl 3,6,9-trioxaundecanedioate, dinonyl 3,6,9-trioxaundecanedioate, didecyl 3,6,9-trioxaundecanedioate, didodecyl 3,6,9-trioxaundecanedioate, distearyl 3,6,9-trioxaundecanedioate, or dilauryl 3,6,9-trioxaundecanedioate.

9. An ink composition in accordance with claim 1 wherein said colorant is dye present in an amount of from about 0.05 to about 20 weight percent.

10. An ink composition in accordance with claim 1 wherein said colorant is a dye present in an amount of from about 1 to about 10 weight percent.

11. An ink composition in accordance with claim 1 wherein said colorant is the dye cyan, magenta, yellow, blue, green, brown, black, or mixtures thereof.

12. An ink composition in accordance with claim 1 wherein said poly(alkylene oxide)-alkylate (I), said poly(alkylene oxide)-dialkylate (II), said polyoxa-alkanoate ester (III), or said polyoxa-alkanedioate diester (IV) is present in an amount of from about 60 to about 99 weight percent.

13. An ink composition in accordance with claim 1 wherein said poly(alkylene oxide)-alkylate (I), said poly(alkylene oxide)-dialkylate (II), said polyoxa-alkanoate ester (III), or said polyoxa-alkanedioate diester (IV) is present in an amount of from about 80 to about 95 weight percent.

14. A printing process which comprises (a) incorporating into an acoustic ink jet printer an ink composition comprised of a colorant and a vehicle of a poly(alkylene oxide)-alkylate (I), a poly(alkylene oxide)-dialkylate (II), a polyoxa-alkanoic ester (III) or a polyoxa-alkanedioic diester (IV), and which ink possesses a viscosity of from about 1 centipoise to about 15 centipoise at a temperature of from about 125° C. to about 165° C., and which vehicle is of the formulas

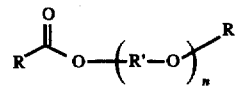

I

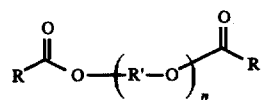

II

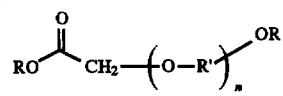

III

-continued

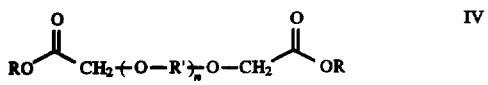

wherein R is alkyl with from 1 to about 50 carbon atoms, n is an integer of from about 2 to about 20, and R' is alkylene with from about 2 to about 50 carbon atoms; and (b) causing droplets of the ink to be ejected in an imagewise pattern onto a substrate.

15. A process which comprises providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a colorant and a vehicle of a poly(alkylene oxide)-alkylate (I), a poly(alkylene oxide)-dialkylate (II), a polyoxa-alkanoic ester (III), or a polyoxa-alkanedioic diester (IV); and said ink possessing a viscosity of from about 1 centipoise to about 15 centipoise at a temperature of from about 125° C. to about 165° C.

16. An ink composition in accordance with claim 1 wherein said vehicle is poly(ethylene-oxide) distearate, stearyl 3,6-dioxaheptanoate, or stearyl 3,6,9-trioxadeconoate.

17. An ink composition in accordance with claim 1 wherein said colorant is present in said ink in an amount of from about 0.05 to about 4 percent by weight, and said ink possesses a viscosity of from about 1 to about 10.

18. An ink composition in accordance with claim 1 wherein the viscosity is from about 1 centipoise to about 6 centipoise at a temperature of from about 140° C. to about 160° C.

19. An ink composition in accordance with claim 1 wherein R is methyl, ethyl, propyl, butyl, pentyl, hexyl, heptyl, octyl, nonyl, decyl, undecyl, dodecyl, tridecyl, hexadecyl, octadecyl, stearyl, lauryl, 2'-methylpentyl; and R' is ethylene, propylene, butylene, pentylene, hexylene, heptylene, octylene, nonylene, decylene, undecylene, dodecylene, tridecylene, hexadecylene, octadecylene, stearylene, laurylene, or 2'-methylpentylene.

20. An ink composition in accordance with claim 1 wherein R is stearyl or dodecyl, and R' is ethylene or propylene.

21. An ink composition in accordance with claim 1 wherein R is stearyl.

22. An ink composition in accordance with claim 1 wherein R is dodecyl.

23. An ink composition in accordance with claim 1 wherein R' is ethylene.

24. An ink composition in accordance with claim 1 wherein R' is propylene.

25. An ink composition in accordance with claim 1 wherein R is methyl and R' is ethylene.

26. An ink composition in accordance with claim 1 wherein R is methyl and R' is propylene.

27. An ink composition in accordance with claim 1 wherein said alkyl contains from 1 to about 50 carbon atoms.

28. An ink composition in accordance with claim 1 wherein said alkyl contains from 1 to about 10 carbon atoms.

29. An ink composition in accordance with claim 1 wherein said alkylene contains from 2 to about 50 carbon atoms.

30. An ink composition in accordance with claim 1 wherein said alkylene contains from 2 to about 20 carbon atoms, and said ink possesses a viscosity of from about 1 to about 10.

31. An ink composition in accordance with claim 1 wherein said arylene contains from 7 to about 24 carbon atoms.

32. An ink composition in accordance with claim 1 wherein said arylene is phenylene.

33. An ink composition in accordance with claim 5 wherein said vehicle is present in an amount of from about 85 to about 97 percent by weight of the ink, and said ink possesses a viscosity of from about 9 to about 15 at from about 130° C. to about 165° C.

34. An ink composition in accordance with claim 6 wherein said vehicle is present in an amount of from about 85 to about 97 percent by weight of the ink.

35. An ink composition in accordance with claim 7 wherein said vehicle is present in an amount of from about 85 to about 97 percent by weight of the ink, and said ink possesses a viscosity of from about 9 to about 15 at from about 130° C. to about 165° C.

36. An ink composition in accordance with claim 8 wherein said vehicle is present in an amount of from about 85 to about 97 percent by weight of the ink.

37. An ink composition in accordance with claim 1 wherein alkyl is alkyleneoxy.

38. An ink composition in accordance with claim 1 wherein said viscosity is about 5 to 9 centipoise at 140° C.

* * * * *